J. C. Miller,
Riding Saddle.
No. 53,854.    Patented Apr. 10, 1866.
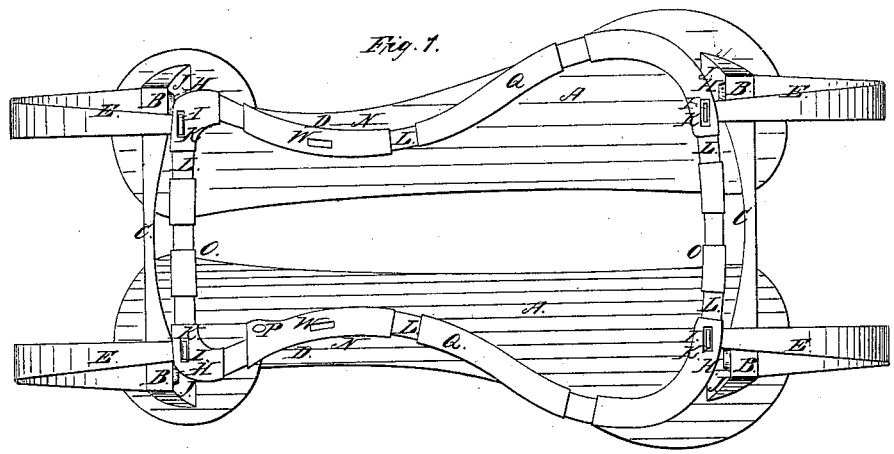
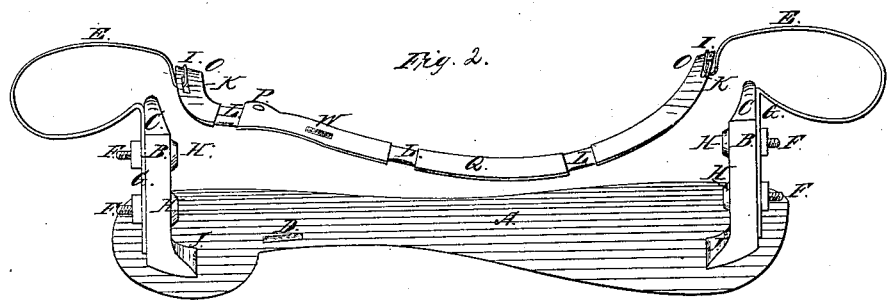
Witnesses
Inventor:
John C. Miller

UNITED STATES PATENT OFFICE.

JOHN C. MILLER, OF LOUISVILLE, KENTUCKY.

IMPROVED SPRING-SADDLE.

Specification forming part of Letters Patent No. 53,854, dated April 10, 1866.

*To all whom it may concern:*

Be it known that I, JOHN C. MILLER, of the city of Louisville, State of Kentucky, have invented a Spring Riding-Saddle for Ladies and Gentlemen; and I do hereby declare that the following is a full and exact description, reference being had to the accompanying drawings, and to the letters of reference thereon.

The nature of my invention is such, and consists in forming a saddle for ladies and gentlemen which is greatly superior in every respect to all other saddles now known or in use. It consists in forming a saddle that for ease and comfort, both to horse and rider, cannot be excelled or rivaled. It is superior to other saddles in cheapness, strength, durability, and beauty, and it is constructed in such a manner that it can be changed in a moment from a gentleman's to a lady's side-saddle.

The nature of my invention is such that the seat of the saddle, when upon the horse's back in use and the horse in motion, will spring upward and downward easily and gracefully, to the delight and pleasure of the rider, at the same time relieving the jerk and jar of the weight of the rider, which jerking and jarring is disagreeable and fatiguing and wearisome to the animal. The relief afforded to the horse is one of the interesting features of this invention.

The nature of this invention also consists in hanging the seat of the saddle upon the ends of the springs several inches above the bars of the tree, giving motion-room to the seat when springing upward and downward when in use.

To enable others skilled in the art of making saddle-trees and saddles to make use of my invention, I will proceed to describe its construction and operation.

Figure No. 1 represents a view of the saddle-tree with the springs attached to the columns of the tree and the frame of the seat hanging upon the ends of the springs. The view of Fig. No. 2 is a top view.

The letter A refers to the bars or bearing part of the tree. Said bars are to be constructed upon the same plan and shape as the bars of a Texas or Spanish tree-bar—that is, underneath the bar. On top the bar must be hollowed or dished out in order to remove unnecessary weight. The tree is intended to be cast out of malleable iron or brass. The proportion and size of the different parts of the tree are as follows: The bars of the tree should be from one-eighth to three-sixteenths of an inch in thickness, breadth of bar according to size of tree. The columns and arches should be one-quarter of an inch in thickness. The columns should be from one inch to one and a half inch in width, according to size of tree. The arch should be from one-half to three-quarters of an inch in width; but the above proportions are neither positive nor important, only regulating the weight of the saddle. By constructing the bars of the tree on the same shape as the Spanish or Texas tree underneath, the saddle is made easy and comfortable to the horse and will not hurt or injure the back of the animal.

The letters B and C refer to the columns and arches at the forward and rear ends of the tree, which columns and arches are to take the places of the cantle and fork of the Spanish or Texas tree. B is the column, and the letter C refers to the arch. Said arch is to bend both upward and outward both at rear and front. The arching upward is for the purpose of clearing the horse's back; the arching outward for the purpose of clearing the seat in its springing motion. The arch itself is for the purpose of connecting and bracing out the bars of the tree and keeping them in their proper positions.

The columns marked B are for the purpose of a fastening for the springs, which are attached to the columns by means of bolts going through the flanges of the springs. Said flanges are referred to by the letter G. They are to be bolted with two bolts each, to prevent the springs from turning to the sides. The end of the spring must be inward and spring must be bolted on the outside or end facing of the column.

The letter I refers to the coupling-hook of the springs. Said hooks are for the purpose of coupling the tree and seat together by means of the coupling-holes in the frame of the seat. Reference is made to the said holes by the letter K.

The end sides or faces of the columns must be made square or flat, and the opposite side should be made sloping gradually outward in a shapely manner into a foot or base for the columns, also for strength; or they should be made with a web extending from the top of the column to the base, for the purpose of bracing and strengthening the column against the strain, which is from the ends toward the center of the tree. Reference is had to the foot or base of the columns by the letter J.

The letters H and F refer to the heads and ends of the bolts going through the columns of the tree and fastening the springs to said columns.

The letter E refers to the springs, which must be made of spring-steel about in the shape of a circular hook, which gives great elasticity to the spring. The springs can be made either flat or round, (not important;) but the flange of the spring should be made flat, so that it may be firmly fastened to the columns of the arches.

The springs should be made tapering from the corner formed by the flange to the bend forming the coupling-hook. They should be made tapering both in breadth and thickness, in order that superfluous weight may be removed and the whole saddle be as light as possible, and because the strain upon the spring gradually lessens as the end is approached, and for the purpose of giving grace and symmetry to the saddle.

The coupling-hooks of the springs should be made in such a manner upon the springs as to slip snugly and closely through the holes of the seat-frame and hold it securely in its place, and so that the seat can be removed when desired.

The letters D, Figs. 1 and 2, refer to the girth-bar in the bars of the tree, which is for the purpose of fastening the girth to the tree which fastens the saddle to the back of the horse. The girth-bar should be raised somewhat above the bar of the tree, or made less in thickness, in order that the girth, when stitched around the bar, will not form any extra thickness underneath the saddle-bar, which would be injurious and uncomfortable to the horse.

Fig. No. 2 represents a side elevation, showing one-half of the saddle-tree with springs attached and the shape of the springs.

The letter Q refers to the seat-frame. Said frame is to be cast of brass or malleable iron; can be made of wrought-iron. It should be about three-eighths of an inch in thickness by three-quarters in breadth for full-sized saddle; others in proportion to size. The shape of the frame should be oval as regards thickness; but otherwise, as regards the seat, it should arch downward at the ends and bow toward each end from the center of the seat. When the small or neck of the seat is approached the frame should be made warped, or the inside edge pointing upward, to prevent the frame of the seat from bearing uncomfortably against the leg of the rider, which leg falls over and from the seat at the small or neck of the seat. The neck or small of the seat is referred to by the letter N.

The letter W refers to the holes forming the tirrup-bars. Their position must be regulated by the size of the saddle and the kind of saddle, whether a lady's or gentleman's saddle. Any saddler will know their position upon the different kinds and sizes of saddle-seats.

The letters L refer to the sockets in the frame of the seat. They should be sunk in the frame of the seat sufficiently to level the web-straining with the frame of the seat. The sockets should be about one-sixteenth of an inch in depth; should be two or three webs running lengthwise of the seat, and two crosswise for a man's saddle and three for a side-saddle. Upon a side-siddle one of the cross-webs should be forward of the horn. Rawhide can be used in the place of webbing, if desired. The sockets for the webbing are for the purpose of preventing it from slipping from its place. The webbing should be stitched with wax-ends, and have sufficient lap to hold stoutly. After the webbing is all on the whole frame should be covered with leather stitched at the edges of the frame.

The rounding or flat shape of the seat is regulated as desired by the drawing of the straining, which every saddler understands.

In covering the frame of the seat with leather the coupling-holes and stirrup-bars must be left bare. When this is done the seat is ready for the hood.

The hood can be made of hog-skin, enameled leather, or skirting, as desired, with or without jockeys. (Not important.) If the hood is made of hog-skin or enameled leather, it should be lined with bridle or skirting leather to prevent the webbing from cutting through the seat or hood.

In preparing the hood the lining should be dampened and drawn over the seat or a block shaped like the seat, and then allowed to dry before using. It will then preserve its shape and fit closely and smoothly, and never get out of shape.

After the hood is drawn on it should be stitched in the leather covering the frame, which will fasten it firmly to its place. When the hood is attached to the seat-frame the seat is complete and ready to be hung upon the springs of the saddle-tree, and then, when stirrups are attached to the frame at the stirrup-bars and a girth through the bars of the tree, the saddle is ready for use. No pad is necessary, and fenders should be applied to the stirrup-leathers to protect the leg from mud, &c.

The letters O refer to the head and cantle of the seat, from which the seat must slope downward to the center in the manner of a bow, and circle downward to the sides to give the necessary shape to the seat.

The letter P refers to a shoulder cast upon the inside of the frame and hole within, for the purpose of attaching a little horn by means of a screw-thread upon the horn and in the hole through shoulder, which attachment of the horn forms a side-seat frame for the use of ladies, which can be placed upon the springs of the saddle when the man's seat is taken from it, thus changing the whole arrangement from a gentleman's to a lady's side-saddle.

The shoulder and hole for the little horn should be placed about four inches back from the front of the frame to give pommel-room, and the seat for side riding should be built flat and level instead of round—that is, crosswise of the tree; otherwise the same as a man's seat. Each saddle can have two seats, one for a lady and the other for a gentleman, to be used as desired.

The letter K refers to the coupling-holes by and through which the seat is swung up the springs at the hooks marked I. The springs must bend far enough forward to allow free motion of the seat between the columns and arches.

This saddle can be ornamented in the highest style known to the painter's or saddler's art. The whole tree, which is left bare to sight, can be beautifully painted or covered with quilted leather, also the springs.

The saddle, on account of its great strength, cheapness, and durability, would make a good military saddle.

What I claim, and desire to secure by Letters Patent, is—

Constructing the seat of the saddle separate from and independent of the bars of the tree, and hanging the said seat upon the ends of springs at a distance of several inches above the bars of the tree, all constructed as herewith described and set forth.

JOHN C. MILLER.

Witnesses:
IRA JONES,
W. J. MCGONIGAL.